United States Patent [19]

Quitberg

[11] 4,196,912
[45] Apr. 8, 1980

[54] FLUID-PRESSURIZED FACE SEAL

[75] Inventor: Leo V. Quitberg, Carlsbad, N. Mex.

[73] Assignee: Amax Inc., Greenwich, Conn.

[21] Appl. No.: 963,554

[22] Filed: Nov. 24, 1978

[51] Int. Cl.² .............................................. F16J 15/34
[52] U.S. Cl. .................... 277/81 R; 277/27; 277/205
[58] Field of Search ................... 277/3, 27, 38, 37, 81, 277/205

[56] References Cited

U.S. PATENT DOCUMENTS

| | | | |
|---|---|---|---|
| 2,902,301 | 9/1959 | Daeschner | 277/81 R |
| 3,179,422 | 4/1965 | Phillips | 277/27 |
| 3,294,409 | 12/1966 | Burtis | 277/205 |
| 3,606,350 | 9/1971 | Grauelle | 277/27 |
| 4,104,169 | 8/1978 | Müller | 277/27 |

Primary Examiner—Robert I. Smith
Attorney, Agent, or Firm—Michael A. Ciomek; Eugene J. Kalil

[57] ABSTRACT

A fluid-pressurized face seal device is provided for use in sealing a rotatable shaft in heavy duty equipment. At least an end portion of the shaft is surrounded by a housing to which said seal device is attached. The seal comprises a cylindrical annular seal carrier surrounding the shaft and mounted to the housing, the housing defining a space adjacent the shaft containing fluid under pressure. The seal carrier has an annular chamber characterized by spaced walls for receiving and supporting annular seal elements therein, the seal carrier containing a first fluidly expandable annular seal element located within the chamber in sealing engagement with the spaced walls. A second seal element is stationarily mounted in the chamber in abutting relationship with the first seal, the second seal having an end portion extending laterally outward of the annular chamber, a rotatable third annular seal element being fixed to the shaft and spaced forward of the second seal element in sealing contact with a face of the third rotatable seal element. A fluid inlet is provided in the cylindrical seal carrier in communication with the annular chamber thereof in which the fluidly expandable seal is located, whereby non-corrosive fluid fed under pressure, e.g., air, liquid, etc., through said fluid inlet into the annular chamber causes the first seal to expand and provide a tight seal against the walls of said annular chamber and also maintain continuous pressure against the rotatable third seal member via the abutting second seal member.

11 Claims, 6 Drawing Figures

FLUID-PRESSURIZED FACE SEAL

This invention relates to fluid-pressurized face seal assemblies and, in particular, to rotary end face seals for use on rotatable shafts in heavy duty equipment.

STATE OF THE ART

Various seal devices have been utilized in the prior art to provide effective pressurized sealing of rotating shafts. Such devices have included lip seals, braided packing, spring-loaded mechanical seals, magnetic particle seals, mercury seals, and labyrinth seals, among others. However, such seals have had their disadvantages.

Lip seals are generally effective when the rotating shaft runs with a very low eccentricity and under clean conditions. Braided packing is subject to high friction losses and to wear. Spring-loaded mechanical seals are expensive and are loaded at predetermined pressure. Labyrinth seals tend to leak, and mercury and magnetic particle seals are limited in operating pressure differential and are highly specialized in design.

As examples of various types of seals, reference is made to U.S. Pat. Nos. 3,162,452, 3,239,232, and 3,521,890.

U.S. Pat. No. 3,162,452 relates to a rotary mechanical seal using spring biasing means acting on a pair of double sealing wedges located in an annular seal carrier.

U.S. Pat. No. 3,239,232 discloses a rotary shaft seal comprising a support ring having an inner periphery for tightly hugging the shaft, a fragmental spherical outer periphery, a mating ring surrounding the support ring having an inner periphery mating with the outer periphery of the support ring in tiltable relation, a peripheral groove around the support ring, a seal ring in the groove engaging the mating ring and tang and slot means on the support and mating rings for driving the mating ring from the support ring without transmitting tilting movements between the mating ring and the support ring.

U.S. Pat. No. 3,521,890 relates to a lip seal cartridge device for a horizontal rotating shaft of a mixer. The cartridge includes spaced apart inner and outer lip seal elements disposed about the shaft and retained in a split sleeve shaped to receive the seal elements and a split retainer clamped to a portion of the mixer. The seal elements are resilient, circular in form with at least one discontinuity. Space between the elements is provided with coolant from an external source.

The improvement of the present invention resides in a seal device which can tolerate shaft eccentricity and dirty surroundings; the seal runs with minimum friction; and the seal is capable of extended wear and also long life.

The seal is particularly applicable for shafts in slow moving heavy duty machinery with shaft eccentricity and runout, such as compacting mills.

OBJECTS OF THE INVENTION

It is an object of the invention to provide a fluid-pressurized face seal assembly adapted for use on shafts of heavy duty equipment characterized by shaft eccentricity.

Another object of the invention is to provide a fluid-pressurized face seal assembly for use on a rotatable shaft comprising an annular seal chamber containing a fluid expandible first annular seal in abutting relationship with a second annular seal element, with a part of said second seal member extending laterally out of the annular chamber in face-to-face contact with a rotatable seal member fixed to said shaft. The first seal is under fluid pressure via a fluid inlet duct communicating with the annular chamber to maintain sealing contact through the second seal element to the rotatable seal.

These and other objects will more clearly appear when taken in conjunction with the following disclosure and the accompanying drawings, wherein.

STATEMENT OF THE INVENTION

Stating it broadly, the invention relates to a fluid-pressurized face seal assembly for use in sealing a rotatable shaft in heavy duty equipment, at least an end portion of said shaft being surrounded by a housing to which said seal device is attached, the seal assembly comprising, a cylindrical annular seal carrier surrounding said shaft and mounted to said housing surrounding a shaft portion to be sealed, said seal carrier having an annular chamber characterized by spaced walls for receiving and supporting annular seal elements therein, a fluidly expandable first annular seal element located within said chamber in sealing engagement with said spaced walls, a second annular seal element stationarily mounted in said chamber in abutting relationship with said first seal, said second seal having an end portion extending laterally outward of said annular chamber, a rotatable third annular seal element fixed to said shaft spaced forward of said second seal element in sealing contact with a face of said third rotatable seal element, and a fluid inlet duct means in said cylindrical seal carrier and communicating with the annular chamber thereof in which said fluidly expandable seal is located, whereby fluid fed under pressure through said fluid inlet into said annular chamber causes said first seal to expand and provide a tight seal against the walls of said annular chamber and also maintain continuous pressure against said rotatable third seal element via said abutting second seal element.

The invention is applicable to the construction of an outside seal or of an inside seal. An outside seal is one disposed outside the confines of the housing surrounding the end portion of the shaft; that is to say, it is not submerged in the process fluid surrounding the shaft within the portion of the housing as will be described later. The inside seal is one disposed within the chamber defined by the housing which contains process fluid under fluid pressure. Inside seal assemblies are preferred for most effective sealing and immunity to dust surroundings.

Figure 1:
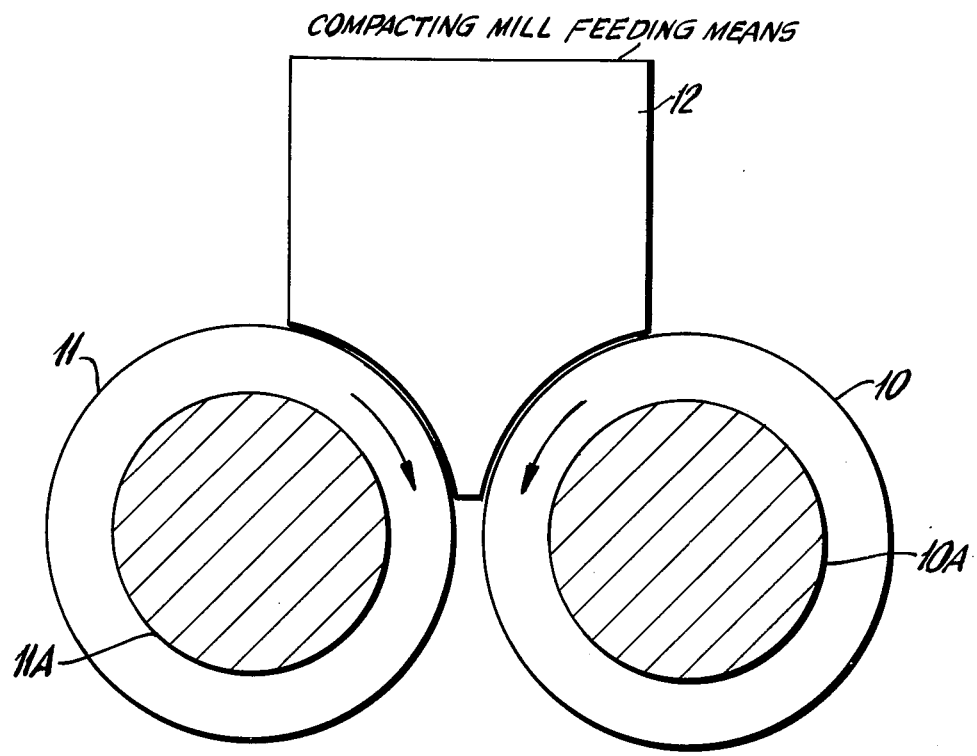
FIG. 1 is a schematic of an compacting mill comprising a pair of heavy duty rolls by means of which ore is compacted by means of roll pressure.

The seal assembly of the invention is intended for prolonged life on slow moving heavy equipment with shaft eccentricity and runout as generally prevails in compacting mills. One type of compactor is shown schematically in FIG. 1 comprising a pair of oppositely rotatable heavy duty rolls 10, 11 with shafts 10A and 11A indicated for convenience in cross section. Ore feeding means 12 is provided as shown schematically for feeding crystalline or other particulate material to the nip of the rolls for compaction. A typical compactor is one manufactured by Allis Chalmers under the designation 2424C Compactor. The heavy duty aspect of this compactor will clearly appear where the rolls are 24 inches in diameter and the shafts 15 inches in diameter, and wherein the compactor requires a 300 HP motor to operate the equipment. Thus, a seal assembly with substantially long life is very desirable to reduce down time for maintenance and assure a high level of productivity.

Figure 2:
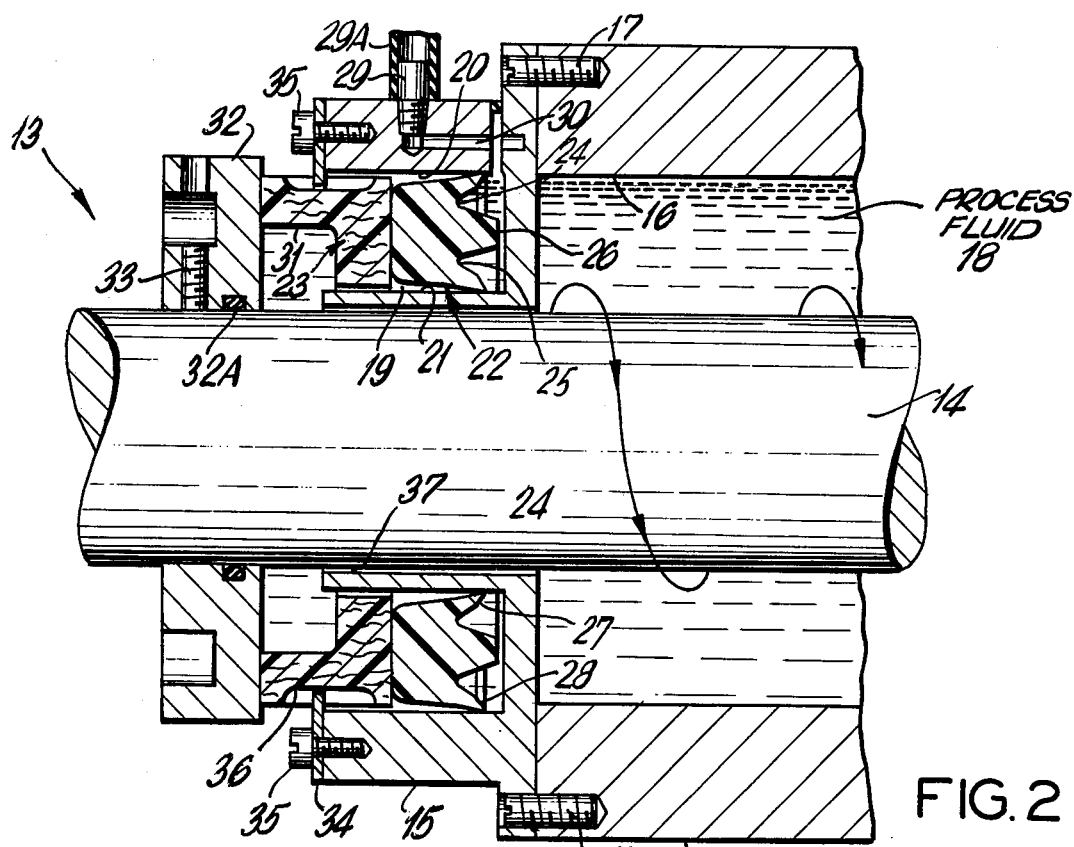
FIGS. 2 and 3 are two embodiments of the seal assembly of the invention in the form of outside and inside seals, respectively.

Referring to FIG. 2, an outside mounted seal assembly 13 is shown surrounding shaft 14, the seal assembly comprising a seal carrier 15 of annular construction fastened to a bearing housing 16 by means of capscrews 17, the bearing housing confining within it process fluid (lube) 18 under fluid pressure.

The seal carrier has an annular chamber 19 defined by laterally extending inner walls 20, 21, said annular chamber containing a pair of annular seal elements 22, 23 in abutting relationship with each other. Seal 22 is preferably made of resilient elastomeric material, such as Buna-N rubber, Neoprene, and the like. Seal 22, which is expandible, is more clearly shown in FIG. 4, the seal having at least one annular V-groove therein, for example, two V-grooves 24, 25 separated by a center post 26, the grooves defining wings or lips 27, 28 having the property of expanding outwardly as fluid pressure is applied against the groove-side of the seal to effect a tight seal with the side walls of the annular chamber in seal carrier 15 of FIGS. 2 and 3. The seal is an easily available and economical molded elastomer packing ring. An exampler of such a seal is one sold under the trademark UNEEPAC by the Johns-Manville Corporation.

Referring again to FIG. 2, fluid inlet 29 is provided in the seal carrier together with fluid ducts 30 through which fluid under pressure via hydraulic hose 29A is fed, the pressurized fluid applying hydrostatic pressure on the groove-side of seal 22 (note FIG. 4), causing lips 24, 25 to expand outwardly against side walls 20, 21, respectively, and form a tight seal therewith, while at the same time force seal 22 against stationary seal 23 having an extending leg portion 31 in abutting relationship with rotating seal member 32 fixed to shaft 14 via set screw 33 and sealed by O-ring 32A.

By way of example, seal 23 may be made of phenolic-impregnated fabric, e.g., linen. However, the seal may be made of many other seal materials, such as of shock-proof sintered refractory carbide comprising tungsten carbide sintered with cobalt as a binding metal.

Annular seal element 32 is held in place by anti-rotation clips 34 fastened into the outer periphery of seal carrier 15 via set screws 35, the clips extending into cut-out spaces 36 disposed in the outer periphery of annular seal 23. Seal carrier 15 has a slight clearance 37 with respect to shaft 14, the sealing contact between seal element 23 and rotating seal 32 providing the necessary seal to inhibit leaking of process fluid 18.

With the foregoing arrangement, only enough pressure is applied to effect sealing. An advantage of this type of seal assembly is that the stationary annular seal 23 can accept up to one-half inch wear before replacement is necessary. Since bearing lube oil is generally the process fluid and since dust is excluded from the rubbing faces, seal life is extended for substantially long periods.

A principal advantage of the seal assembly of the invention is that sealing force remains constant regardless of seal face wear. Moreover, permissible wear is many times greater than with conventional spring-loaded mechanical seals.

Figure 3:
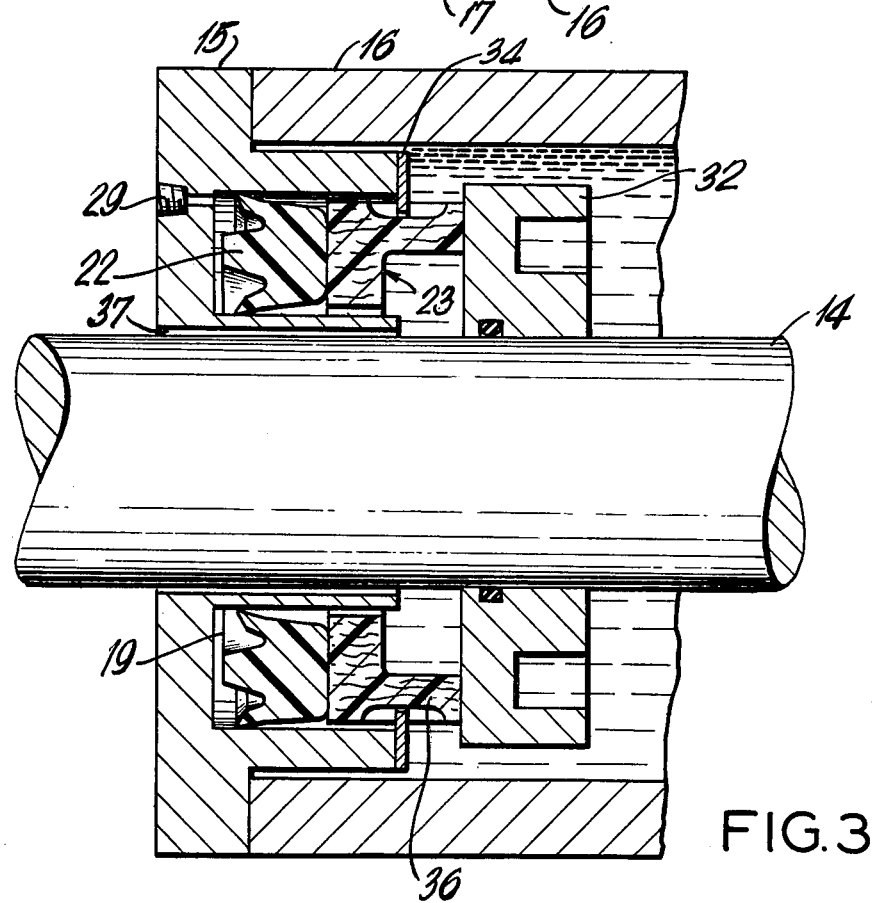

The description for FIG. 2 applies equally to FIG. 3, except the seal of FIG. 3 is an inside mounted seal. Rotatable annular seal element is mounted on shaft 14 within bearing housing 16 as shown, seal carrier 15 being connected to housing 16 and extending into the space of the housing. Fluid inlet 29 is shown for applying fluid under pressure as in FIG. 2 into annular chamber 19 in the same manner as described in the outside seal of FIG. 2.

Figure 4:
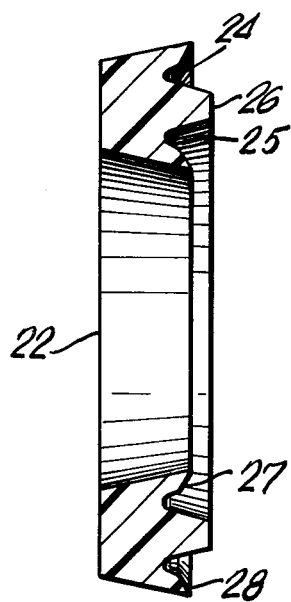
FIG. 4 depicts more clearly one of the seal elements employed in the seal assembly of FIGS. 2 and 3.
Figure 5:
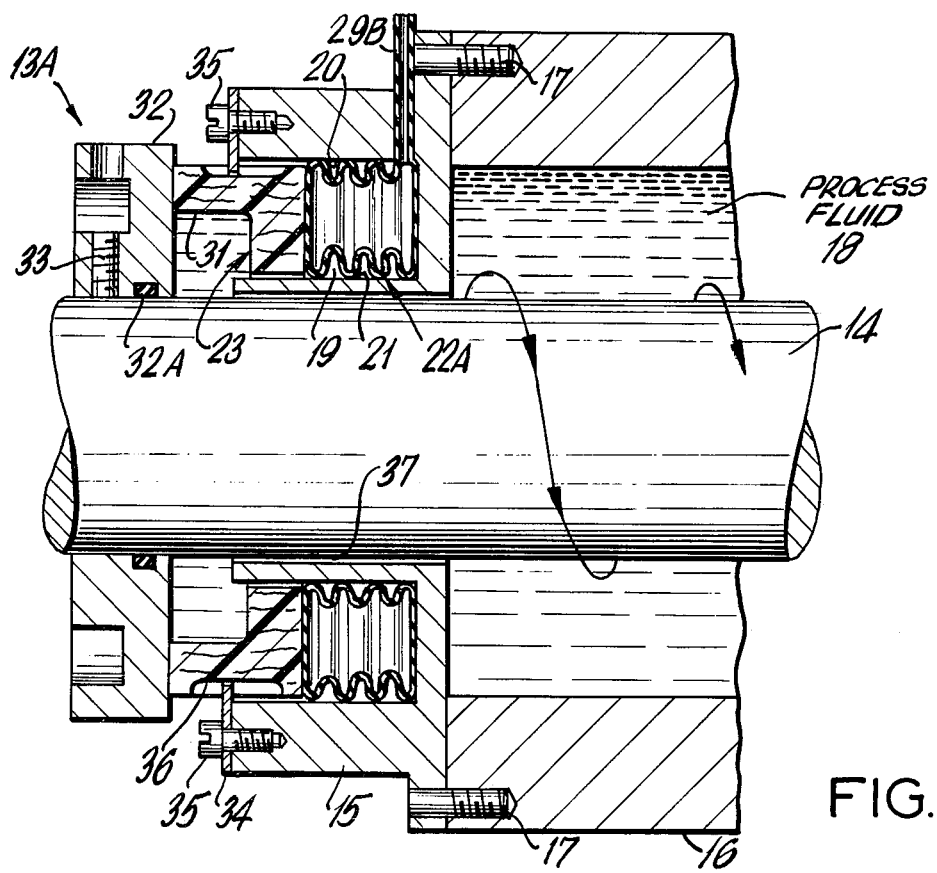
FIGS. 5 and 6 are two additional embodiments of the seal assembly of the invention in the form of outside and inside seals, respectively.

The outside and inside seal assemblies of FIGS. 4 and 5, respectively, show another embodiment of an expandible seal element utilizing an annular hollow corrugated structure of elastomeric material. Thus, referring to FIG. 5, the same parts carry the same designation except that the corrugated seal is given the designation 22A in FIG. 5 and 22B in FIG. 6.

Referring to FIG. 5, an outside mounted seal assembly 13A is shown surrounding shaft 14, the seal assembly comprising a seal carrier 15 of annular construction fastened to a bearing housing 16 by means of capscrews 17, the bearing housing confining within it process fluid (lube) 18 under fluid pressure.

The seal carrier similarly has an annular chamber 19 defined by laterally extending inner walls 20, 21, said annular chamber containing a pair of annular seal elements 22A and 23 in abutting relationship with each other. Seal 22A is made of resilient elastomeric material and has a hollow doughnut-like shape, the shape having a corrugated or bellows-like structure capable of expansion by fluid pressure applied from within. Seal 22A has fluid inlet means 29B through which fluid under pressure is fed to cause expansion of the seal against the walls of the annular chamber and to apply a driving force against stationary seal 23 having an extending leg portion in abutting relationship with rotary seal member 32 fixed to shaft 14 by set screw 33 and sealed via O-ring 32A.

As stated earlier, seal 23 may be made of phenolic-impregnated fabric, e.g., linen, although other known seal compositions may be employed.

The annular seal element 23, as previously described, is held in place by anti-rotation clips 34 fastened into the outer peripheral surface of the seal carrier 15, the clips extending into cut-out spaces 36 disposed in the outer periphery of annular seal 23. As will be noted, seal carrier 15 has a slight clearance 37 with respect to shaft 14, the sealing contact between seal element 23 and rotating seal 32 providing the necessary seal to inhibit leaking of process fluid 18.

The foregoing seal of FIG. 5 works in the same manner as the seal described for FIG. 2.

Figure 6:
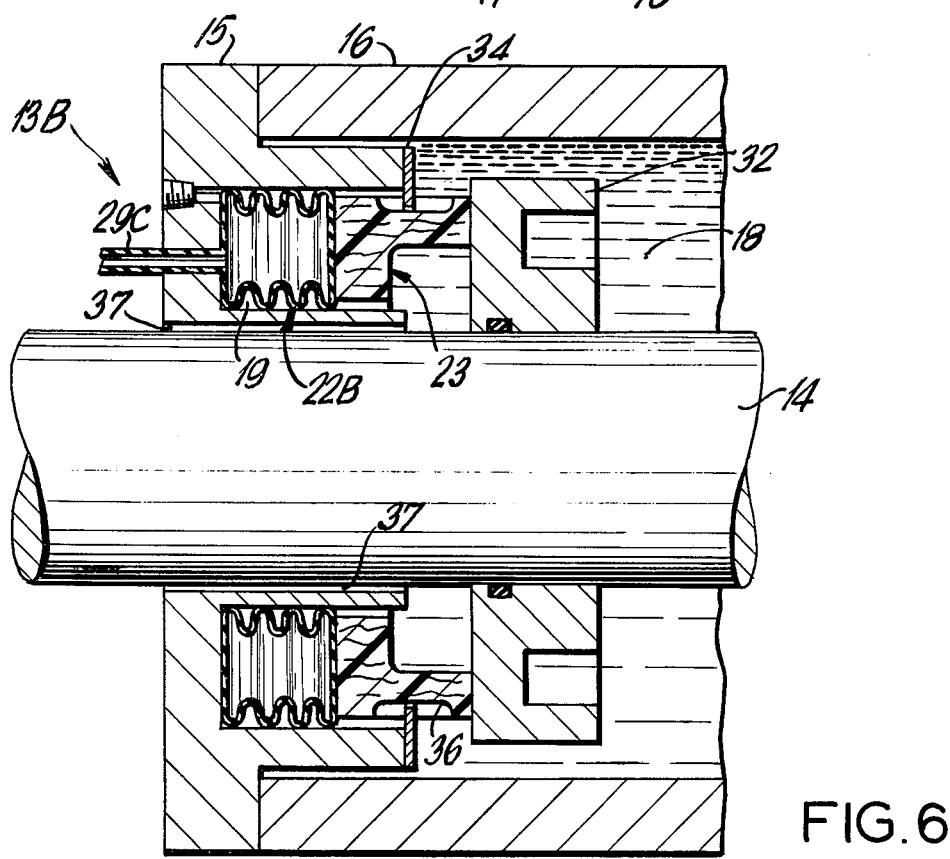

The description for FIG. 5 also applies for the inside seal of FIG. 6, the seal assembly of FIG. 6 being similar to that of FIG. 3 except for the use of a hollow corrugated or bellows-like annular seal 22A.

Thus, referring to FIG. 6, an inside mounted seal assembly 13B is shown surrounding shaft 14, the seal assembly comprising a seal carrier 15 of annular construction extending inward and fastened to a bearing housing 16, the bearing housing confining within it process fluid (lube) 18 under fluid pressure.

The seal carrier similarly has an annular chamber 19 defined by laterally extending inner walls 20, 21, said annular chamber containing a pair of annular seal elements 22B and 23 in abutting relationship with each other. Seal 22B is the same as 22A of FIG. 5 in that it has a corrugated or bellows-like structure capable of expansion by fluid pressure applied from within. Seal 22B has fluid inlet means 29C through which fluid under pressure is fed to cause expansion of the seal against the walls of the annular chamber and to apply a driving force against stationary seal 23 having an extending leg portion extending inward of the housing and in abutting relationship with inside rotary seal member 32 fixed to shaft 14 and sealed via O-ring 32A, the seal member 32 being disposed within the housing.

The annular seal element 23 as previously described is held in place by anti-rotation clips 34 fastened to seal carrier 15, the clips extending into cut-out spaces 36 disposed in the outer periphery of annular seal 23. Seal carrier 15 has a slight clearance 37 with respect to shaft 14, the sealing contact between seal element 23 and rotating seal 32 providing the necessary seal to inhibit leaking of process fluid 18.

While the seal assembly is disclosed herein by of example for use in compacting mills, it will be appreciated that the seal assembly of the invention may be employed in other types of mills or equipment utilizing rotating shafts requiring seals. The shafts need not be horizontal; moreover, the seal assembly of the invention need not be limited to sealing lubricating oil.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A fluid-pressurized face seal assembly for use in sealing a rotatable shaft in heavy duty equipment, at least an end portion of said shaft being surrounded by a housing to which said seal device is attached which comprises,
    a cylindrical annular seal carrier surrounding said shaft and mounted to said housing surrounding a shaft portion to be sealed, said housing confining a process fluid therein,
        said seal carrier having an annular chamber characterized by spaced walls for receiving and supporting annular seal elements therein,
    a fluidly expandable first annular resilient seal element located within said chamber in sealing engagement with said spaced walls,
    a second annular seal element stationarily mounted in said chamber in abutting relationship with said first seal,
        said second seal having a leg portion extending laterally outward of said annular chamber,
    a rotatable third annular seal element fixed to said shaft spaced forward of said second seal element in sealing contact with a face of said third rotatable seal element,
    and a fluid inlet duct means in said cylindrical seal carrier and communicating with the annular chamber thereof in which said fluidly expandable seal is located,
        whereby fluid fed under pressure through said fluid inlet into said annular chamber causes said first seal to expand and provide a tight seal against the walls of said annular chamber and also maintain continuous pressure against said rotatable third seal element via said abutting second seal element.

2. The fluid-pressurized seal of claim 1, wherein said first seal element has at least a groove on a peripheral face of said element such as to provide lips on each side of the groove against which fluid under pressure is forced to cause said lips to expand outwardly and sealingly engage the walls of said annular chamber in said seal carrier and while pressing against said second seal element.

3. The fluid-pressurized seal of claim 1, wherein said first annular seal has a hollow corrugated structure which communicates with said fluid inlet means, such that applied fluid pressure causes said corrugated seal to expand and provide a tight seal in said annular chamber and against said shaft.

4. The fluid-pressurized seal assembly of claim 1, wherein said seal assembly is an inside seal.

5. The fluid-pressurized seal assembly of claim 1, wherein said seal assembly is an outside seal.

6. A fluid-pressurized outside face seal assembly for use in sealing a rotatable shaft in heavy duty equipment, at least an end portion of said shaft being surrounded by a housing to which said seal device is attached which comprises,
    a cylindrical annular seal carrier surrounding said shaft mounted and extending outward of said housing surrounding a shaft portion to be sealed, said housing confining a process fluid therein,
        said seal carrier having an annular chamber characterized by spaced walls for receiving and supporting annular seal elements therein,
    a fluidly expandable first annular resilient seal element located within said chamber in sealing engagement with said spaced walls,
    a second annular seal element stationarily mounted in said chamber in abutting relationship with said first seal,
        said second seal having a leg portion extending laterally outward of said annular chamber,
    a rotatable third annular seal element fixed to said shaft spaced outward of said second seal element, said second seal being in sealing contact with a face of said third rotatable seal element,
    and a fluid inlet duct means in said cylindrical seal carrier and communicating with the annular chamber thereof in which said fluidly expandable seal is located,
        whereby fluid fed under pressure through said fluid inlet into said annular chamber causes said first seal to expand and provide a tight seal against the walls of said annular chamber and also maintain continuous pressure against said rotatable third seal element via said abutting second seal element.

7. The fluid-pressurized seal of claim 6, wherein said first seal element has at least a groove on a peripheral face of said element such as to provide lips on each side of the groove against which fluid under pressure is forced to cause said lips to expand outwardly and sealingly engage the walls of said annular chamber in said seal carrier and while pressing against said second seal element.

8. The fluid-pressurized seal of claim 6, wherein said first annular seal has a hollow corrugated structure which communicates with said fluid inlet means, such that applied fluid pressure causes said corrugated seal to expand and provide a tight seal in said annular chamber and against said shaft.

9. A fluid-pressurized inside face seal assembly for use in sealing a rotatable shaft in heavy duty equipment, at least an end portion of said shaft being surrounded by a housing to which said seal device is attached which comprises, a cylindrical annular seal carrier surrounding said shaft mounted to extend inward of said housing surrounding a shaft portion to be sealed, said housing confining a process fluid therein, said seal carrier having an annular chamber characterized by spaced walls for receiving and supporting annular seal elements therein, a fluidly expandible first annular resilient seal element located within said chamber in sealing engagement with said spaced walls, a second annular seal element stationarily mounted in said chamber in abutting relationship with said first seal, said second seal having a leg portion extending laterally inward of said housing, a rotatable third annular seal element fixed to said shaft spaced inward of said second seal element in said housing, said second seal being in sealing contact with a face of said third rotatable seal element, and a fluid inlet duct means in said cylindrical seal carrier and communicating with the annular chamber thereof in which said fluidly expandible seal is located, whereby fluid fed under pressure through said fluid inlet into said annular chamber causes said first seal to expand and provide a tight seal against the walls of said annular chamber and also maintain continuous pressure against said rotatable third seal element via said abutting second seal element.

10. The fluid-pressurized seal of claim 9, wherein said first seal element has at least a groove on a peripheral face of said element such as to provide lips on each side of the groove against which fluid under pressure is forced to cause said lips to expand outwardly and sealingly engage the walls of said annular chamber in said seal carrier and while pressing against said second seal element.

11. The fluid-pressurized seal of claim 9, wherein said first annular seal has a hollow corrugated structure which communicates with said fluid inlet means, such that applied fluid pressure causes said corrugated seal to expand and provide a tight seal in said annular chamber and against said shaft.

* * * * *